(12) United States Patent
Gurule (10) Patent No.: US 11,545,926 B1
(45) Date of Patent: Jan. 3, 2023

(54) POWER GENERATOR SYSTEM WITH MODULAR BLADES

(71) Applicant: Gabriel Gurule, Los Ranchos de Albuquerque, NM (US)

(72) Inventor: Gabriel Gurule, Los Ranchos de Albuquerque, NM (US)

(*) Notice: Subject to any disclaimer, the term of this patent is extended or adjusted under 35 U.S.C. 154(b) by 0 days.

(21) Appl. No.: 17/103,440

(22) Filed: Nov. 24, 2020

Related U.S. Application Data

(60) Provisional application No. 62/941,285, filed on Nov. 27, 2019.

(51) Int. Cl.
   | | |
   |---|---|
   | *H02S 10/12* | (2014.01) |
   | *F03D 13/10* | (2016.01) |
   | *F03D 1/06* | (2006.01) |
   | *B33Y 80/00* | (2015.01) |

(52) U.S. Cl.
   CPC ............ *H02S 10/12* (2014.12); *F03D 1/0675* (2013.01); *F03D 13/10* (2016.05); *B33Y 80/00* (2014.12)

(58) Field of Classification Search
   CPC ......... H02S 10/12; F03D 1/0675; F03D 13/10
   See application file for complete search history.

(56) References Cited

U.S. PATENT DOCUMENTS

| | | | |
|---|---|---|---|
| 7,045,702 B2 | 5/2006 | Kashyap | |
| 2012/0156041 A1* | 6/2012 | Sassow | F03D 3/005 29/888 |
| 2013/0106193 A1 | 5/2013 | Bryson | |
| 2018/0372073 A1* | 12/2018 | Al Tarabsheh | F03D 3/005 |
| 2019/0389128 A1* | 12/2019 | Doolan | B29C 64/153 |

FOREIGN PATENT DOCUMENTS

| | | |
|---|---|---|
| EP | 1626176 A2 | 2/2006 |
| EP | 2128439 A1 | 12/2009 |
| WO | WO-2015081928 A1 * 6/2015 | F03D 1/04 |

OTHER PUBLICATIONS

Singh, Timon, "Scientists Develop Solar-Powered Wind Turbine for Ultimate Energy Generation", https//inhabitat.com/scientists-develop-solar-powered-wind-turbine/, Apr. 1, 2013.

* cited by examiner

*Primary Examiner* — Joseph Ortega
(74) *Attorney, Agent, or Firm* — Peacock Law P.C.; Justin R. Muehlmeyer (57) ABSTRACT

Power generation systems comprising modular blades and a secondary power source, and methods of manufacturing the same employing additive manufacturing. Various features of the system are described, including a rotor, spoke and support base. A slip gear assembly is described to coordinate the wiring of the secondary power sources.

12 Claims, 14 Drawing Sheets

POWER GENERATOR SYSTEM WITH MODULAR BLADES

CROSS-REFERENCE TO RELATED APPLICATIONS

This application claims priority to and the benefit of the filing of U.S. Provisional Patent Application No. 62/941,285, entitled "Solar Powered Wind Turbine", filed on Nov. 27, 2019, and the specification and claims thereof are incorporated herein by reference.

BACKGROUND OF THE INVENTION

Field of the Invention (Technical Field)

Embodiments of the present disclosure relate to modular power generator systems. More specifically, this disclosure relates to green energy power generators with modular components.

Description of Related Art

The proliferation of renewable energy sources such as wind, solar, and electric power have led to an increased demand in manufactured components. The shift away from hydrocarbon-based technologies has reduced demand for construction materials for coal-powered plants and drilling equipment and increased demand for solar cell and wind turbine components. These components must be pre-manufactured and transported to the wind or solar farm site for construction. Vendors often sell uniform components allowing for numerous identical cells or turbines to be constructed at a site. Transportation of individual components drives up costs for renewable energy sources because of the increased time and expense of shipping specialty materials to a distant location and constructing individual units. The high costs create a barrier of use for most individuals and business entities, with many renewable energy farms being built for governments.

The overall cost of renewable energy would be reduced for energy companies and consumers if renewable energy construction costs were offset. A way to offset renewable energy construction costs would be to manufacture components on-site at a reduced cost. Modular components can be made on-site using low-cost construction methods such as 3D printing. Modular components would obviate the need to pay transportation costs for more expensive custom components. Moreover, renewable energy units could be made on demand and be modifiable to account for changes in budget, terrain, weather conditions, and available area. Reducing construction costs would also lower the cost barrier to constructing renewable energy farms and allow more entities and individuals to make and use renewable energy sources.

BRIEF SUMMARY OF EMBODIMENTS OF THE PRESENT INVENTION

The embodiments of the present disclosure generally relate to a power generator system with modular blades capable of rotating to provide a power source, a power generation apparatus, and a method of making a power generation system with modular blades. In one embodiment, the system comprises a modular blade capable of rotating to provide a power source, a rotor, at least one spoke, a support base, and a generator. In another embodiment, the modular blade comprises an end module having a first end and second end, wherein the end module further comprises an end module first half and an end module second half. In another embodiment, the modular blade comprises a T-connector module having a third end, a fourth end, a first side, and a second side, wherein the T-connector module further comprises a T-connector module first half and a T-connector module second half, and wherein the first side has a connection point. In another embodiment, the modular blade comprises at least one middle module having a fifth end and a sixth end, wherein the middle module further comprises a middle module first half and a middle module second half. In another embodiment, the modular blade is 3-D printed. In another embodiment, the modular blade comprises at least two modules. In another embodiment, the system further comprises a secondary power source. In another embodiment, the modular blade comprises a first modular blade half and a second modular blade half. In another embodiment, the rotor comprises an outer area and an inner area and wherein the outer area rotates independently of said inner area, and wherein wiring for the secondary power source is disposed within the inner area between the secondary power source and a gear assembly comprising at least one slip ring. In another embodiment, the system further comprises a bevel gear disposed between a first slip ring of the at least one slip ring and a second slip ring of the at least one slip ring, and the wiring is disposed through the bevel gear.

In one embodiment, the apparatus comprises a modular blade comprising an end module comprising a first end and second end, wherein the end module further comprises an end module first half and an end module second half; and a T-connector module comprising a third end, a fourth end, a first side, and a second side, wherein the T-connector module further comprises a T-connector module first half and a T-connector module second half, and wherein the first side has a connection point. In another embodiment, the first end of the end module comprises a plurality of connectors. In another embodiment, the first end of the end module comprises a plurality of cavities. In another embodiment, the modular blade further comprises at least one middle module having a fifth end and a sixth end, wherein the middle module further comprises a middle module first half and a middle module second half. In another embodiment, the fifth end comprises a plurality of connectors and wherein the sixth end comprises a plurality of cavities. In another embodiment, the fifth end comprises a plurality of cavities and wherein the sixth end comprises a plurality of connectors. In another embodiment, the apparatus is 3D-printed. In another embodiment, the apparatus further comprises a secondary power source.

In one embodiment, the present disclosure relates to a method of manufacturing a power generation system comprising: 3-D printing at least two modular blade components; assembling the at least two modular blade components to form a modular blade; and connecting the modular blade to a spoke. In another embodiment, the spoke is a rotor. In another embodiment, the method further comprises at least partially disposing a secondary power source within the modular blade. In another embodiment, the method further comprises providing a slip ring through which wiring for the secondary power source is disposed.

One of the primary objects of the various embodiments of the present invention is to expand the utility of wind turbine blades to create more electricity. Various embodiments of the wind turbine blades of the present invention preferably comprise solar cells that generate electricity while the wind turbine is spinning or motionless. These solar panels create additional power that would not have been created without the solar panels, at least when the wind turbine is in sunlight.

It is, therefore, one aspect of the disclosed embodiments to provide a method and system for combining photovoltaic cells with a vertical axis wind turbine. It is another aspect of the disclosed embodiments to provide a method and system for creating and storing electricity in minimal wind conditions.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. Any dimensions of the objects in the drawings are for example only and do not limit the scope of the invention. In the drawings.

DETAILED DESCRIPTION OF THE INVENTION

No language or terminology in this specification should be construed as indicating any non-claimed element as essential or critical. All methods described herein can be performed in any suitable order unless otherwise indicated herein. The use of any and all examples, or example language (e.g., "such as") provided herein, is intended merely to better illuminate example embodiments and does not pose a limitation on the scope of the claims appended hereto unless otherwise claimed.

Throughout this specification, the word "comprise", or variations such as "comprises", "comprising", "including", "containing", and the like, will be understood to imply the inclusion of a stated element or integer or group of elements or integers but not the exclusion of any other element or integer or group of elements or integers, unless the context requires otherwise.

As used herein, the singular forms "a", "an", and "the", may also refer to plural articles, i.e., "one or more", "at least one", "and/or", are open-ended expressions that are both conjunctive and disjunctive in operation. For example, the term "plurality of connectors" includes "one or more connectors." Further, each of the expressions "at least one of A, B, and C", "at least one of A, B, or C", "one or more of A, B, and C", "one or more of A, B, or C" and "A, B, and/or C" means A alone, B alone, C alone, A and B together, A and C together, B and C together, or A, B and C together. The term "an entity" refers to one or more of that entity. As such, the terms "a", "an", "one or more", and "at least one" can be used interchangeably herein.

Throughout this specification, the term "prong array" is defined to be a plurality of connectors that may include, but are not limited to, fasteners, bolts, screws, hooks, loops, sockets, and prongs. A prong array is defined to have at least one protrusion or means of connection used to join modules to one another. A prong array may include at least one cavity.

Throughout this specification, the term "cavity array" is defined to be a plurality of cavities that may include, but are not limited to, fasteners, bolts, screws, hooks, loops, sockets, and cavities. A cavity array is defined to have at least one cavity or means of connection used to join modules to one another. A cavity array may include at least one prong or protrusion.

Throughout this specification, the term "modular" is defined to mean comprising a plurality of separable or independent components.

Figure 1:
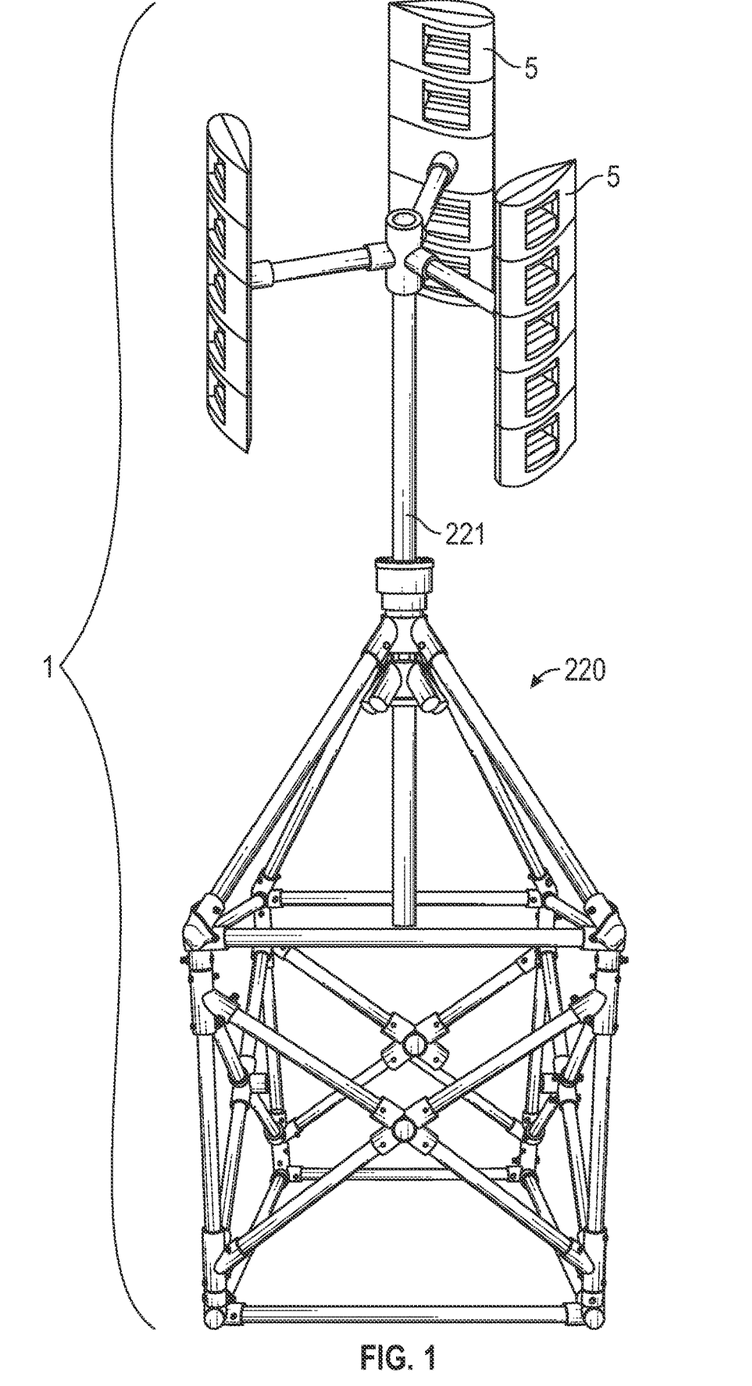
FIG. 1 is a drawing showing of a power generator system with modular blades and the power generator system support base according to an embodiment of the present invention.

Embodiments of the present invention are directed to power generation systems that generate power from more than one source, for example, a wind turbine power generation system that also comprises a second power generation source such as photovoltaic panels. The system depicted in FIG. 1. is an embodiment of a fully assembled power generator system 1 with modular blades 5. Preferably, modular blades 5 are vertically oriented, that is, the primary axis of each modular blade 5 is parallel with rotor shaft 221 that transmits the rotational energy and energy from the secondary power source 30 to the slip gear assembly 225. It should be noted that embodiments of the present invention are not limited to this vertical orientation of modular blades 5. In some embodiments, modular blades 5 are horizontally oriented, that is, the primary axis of modular blades 5 can rotate to be perpendicular to rotor shaft 221 that transmits the rotational energy and energy from the secondary power source 30 to the slip gear assembly 225 that coordinates with a machine for converting mechanical energy into electrical energy, including but not limited to a dynamo.

Figure 2A:
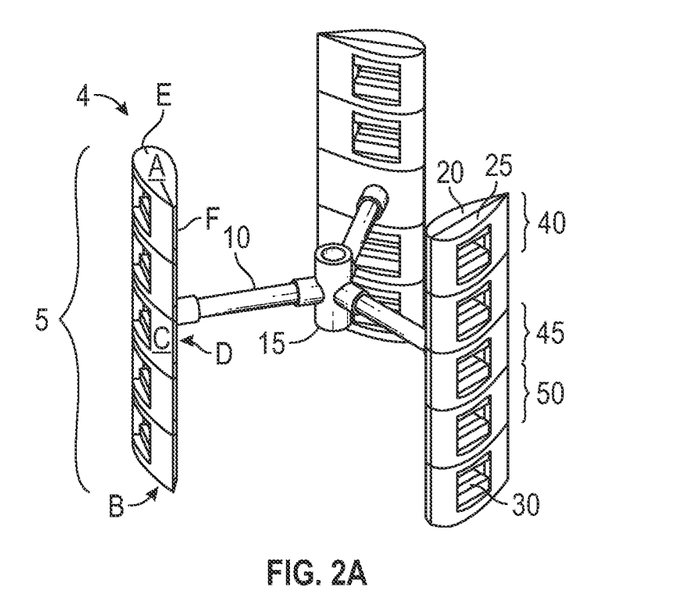
FIGS. 2A, 2B and 2C are drawings showing different views of a modular blades apparatus for a power generator system according to an embodiment of the present invention.
Figure 2B:
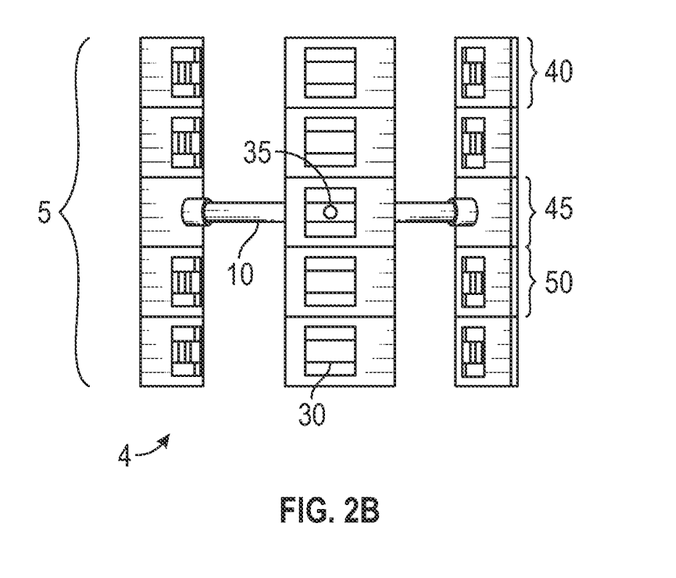
Figure 2C:
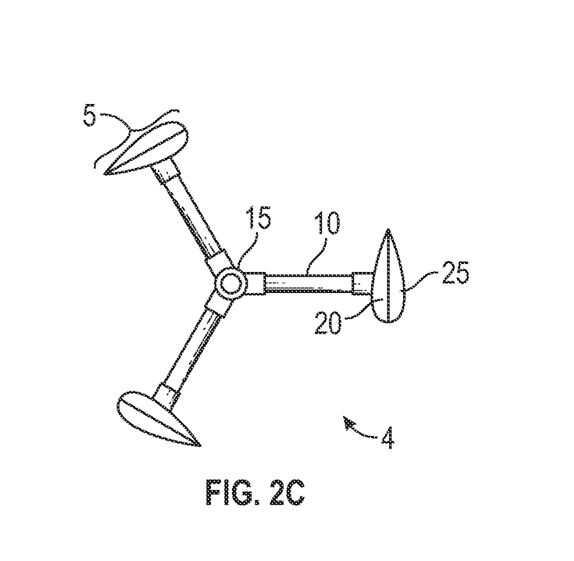

To address the problems discussed in the background section of the present application, embodiments of the present invention are directed to power generation systems that are modular. An embodiment of a modular blade apparatus 4 is shown in FIGS. 2A-2C. Modular blade 5 is preferably connected to spoke 10. Spoke 10 is connected to rotor 15. Modular blade apparatus 4 may have any number of modular blades 5. Modular blade 5 preferably comprises first modular blade half 20 and second modular blade half 25. Each modular blade 5 preferably comprises at least one secondary power source panel 30. The secondary power source preferably includes a secondary power source including but not limited to a solar panel such as a photovoltaic panel, a piezoelectric panel, and/or a heat absorption panel. Each modular blade 5 also preferably comprises at least one end module 40, at least one T-connector module 45, and at least one middle module 50. T-connector module 45 preferably comprises connection point 35 used to connect T-connector module 45 to spoke 10. Preferably, T-connector module 45 is connected to rotor 15. The connection point may be a fastener, aperture, prong, or any other means to connect the T-connector module 45 to spoke 10 or rotor 15.

In order to clarify references for the various surfaces of modular blade 5, and referring to FIG. 2A, modular blade 5 may be referred to as having top A, bottom B, outside C and inside D. The depth of modular blade 5 would refer to the distance between surfaces C and D. Preferably, modular blade 5 comprises an airfoil shape, that is, its depth is larger at front end E than at back end F, and the depth decreases as you move from front end E to back end F. In other embodiments, modular blade 5 is shaped in other ways to facilitate increased wind-induced rotation about its rotational center.

Figure 3:
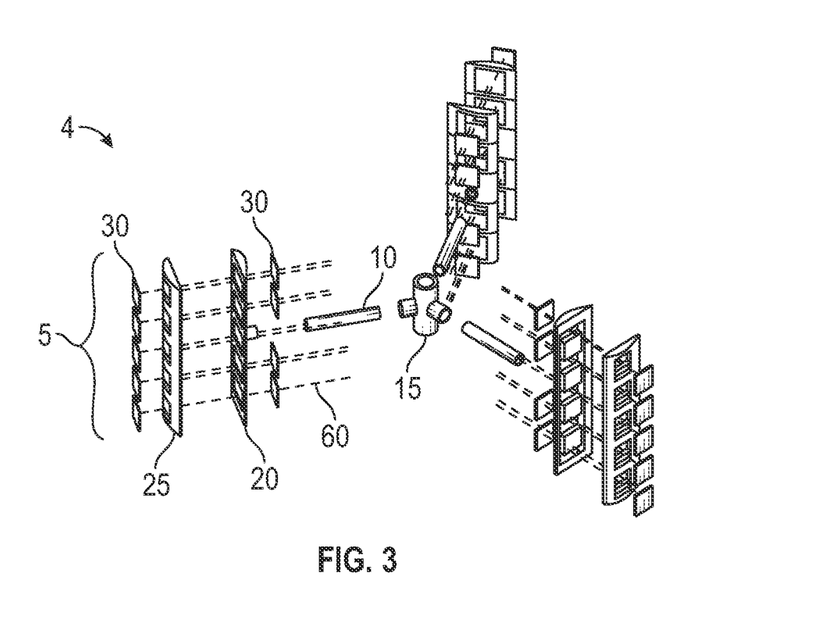
FIG. 3 is a depiction of an exploded view of the modular blades apparatus for a power generator system according to an embodiment of the present invention.

The apparatus shown in FIG. 3 is an exploded view of the modular blade apparatus 4. Preferably, modular blade first half 20 is fitted to modular blade second half 25 and spoke 10. Spoke 10 is connected to rotor 15. Modular blade apparatus 4 preferably comprises at least one modular blade 5. A preferred embodiment of modular blade apparatus 4 comprises three modular blades. Modular blade apparatus 4 may have any number of modular blades 5. Secondary power source 30 is at least partially disposed within modular blade 5. Power conduits 60 run through the modular blade 5 to supplement power generated from modular blade apparatus 4.

Figure 4:
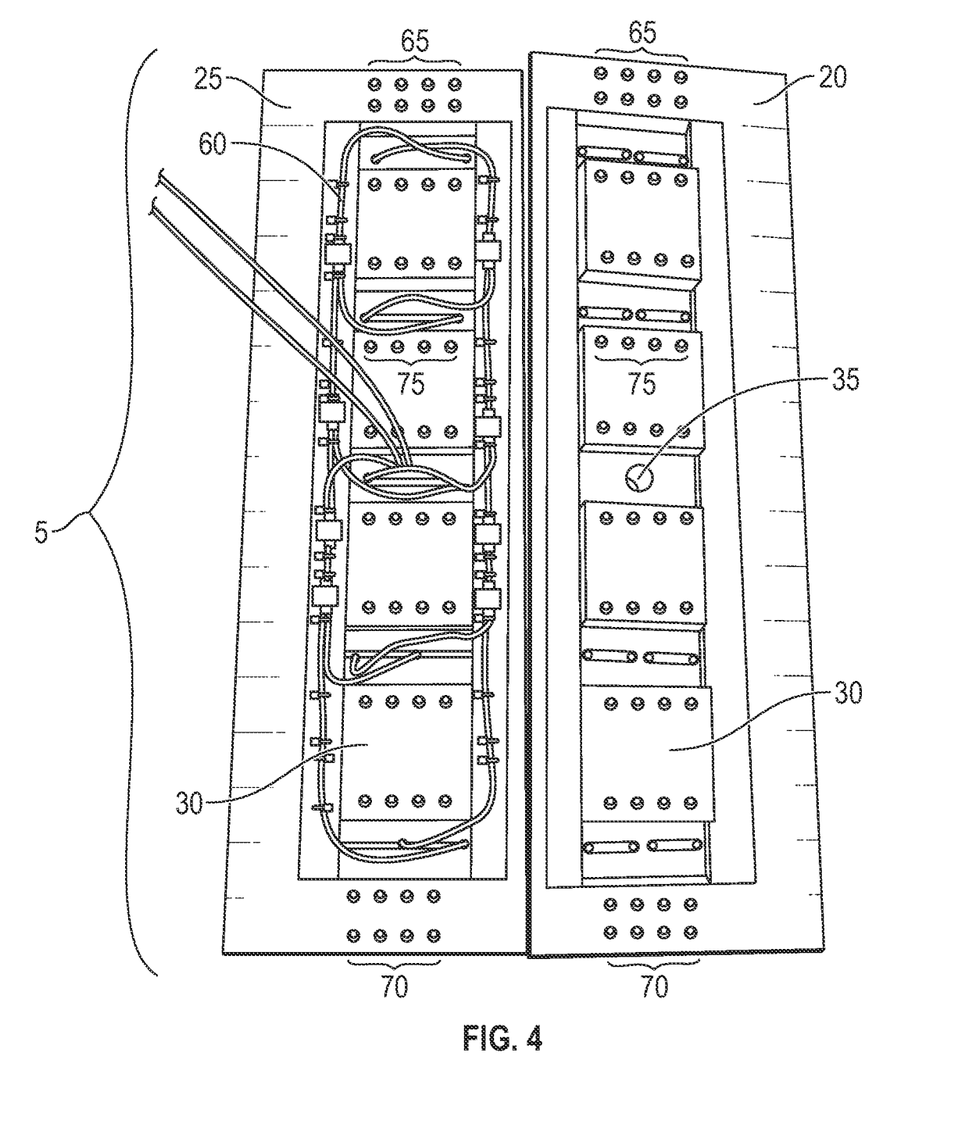
FIG. 4 is an interior view of a modular blade apparatus according to an embodiment of the present invention.
Figure 5A:
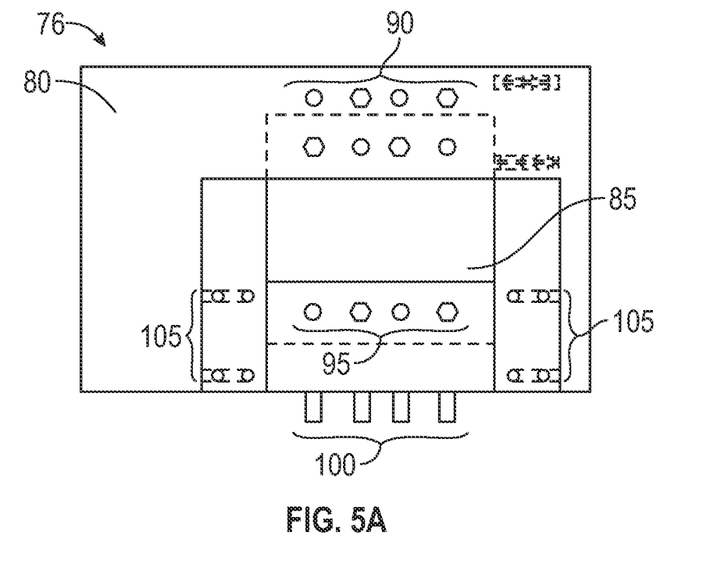
FIGS. 5A, 5B, 5C and 5D are drawings showing different views of a first end module half of a modular blade apparatus according to an embodiment of the present invention.
Figure 5B:
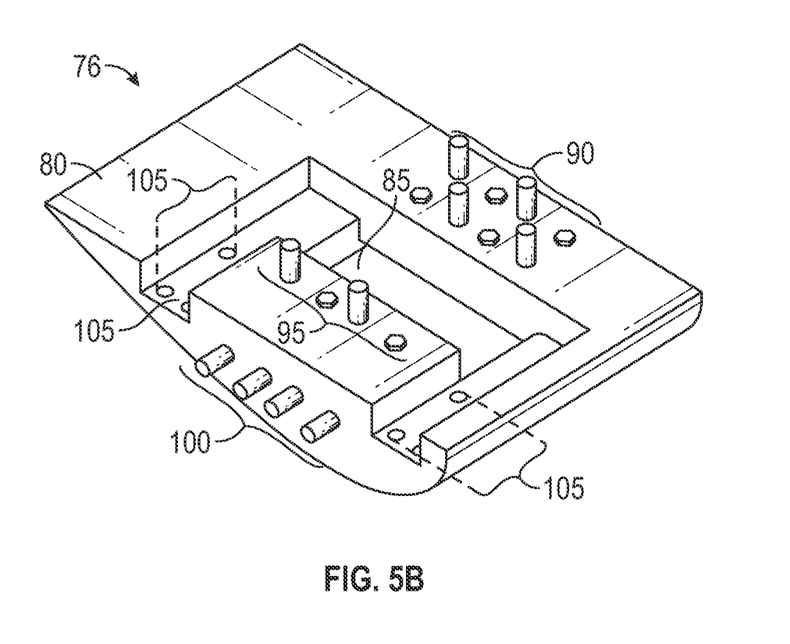
Figure 5C:
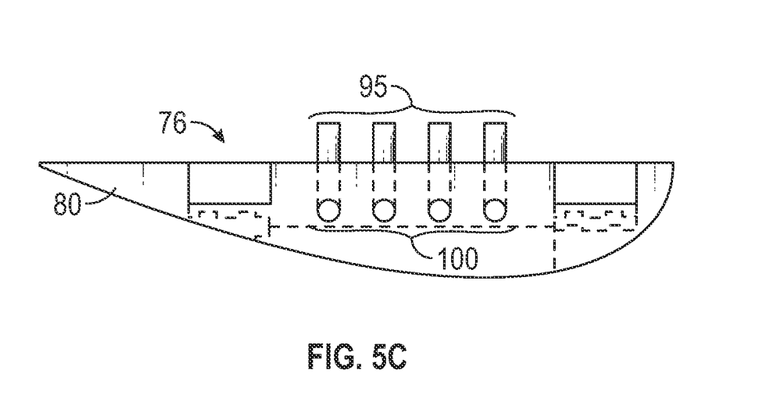
Figure 5D:
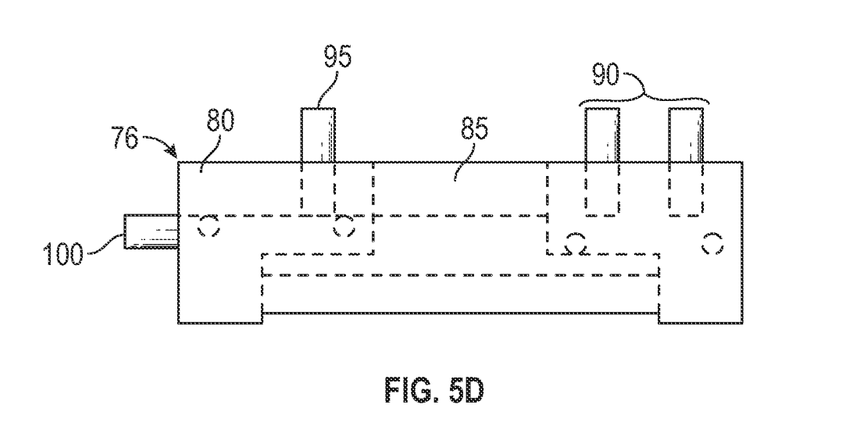
Figure 6A:
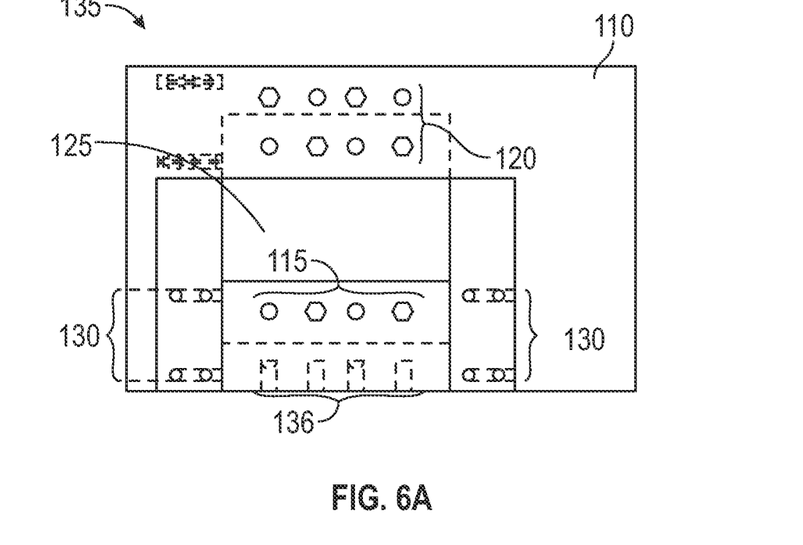
FIGS. 6A, 6B, 6C and 6D are drawings showing different views of a second end module half of a modular blade apparatus according to an embodiment of the present invention.
Figure 6B:
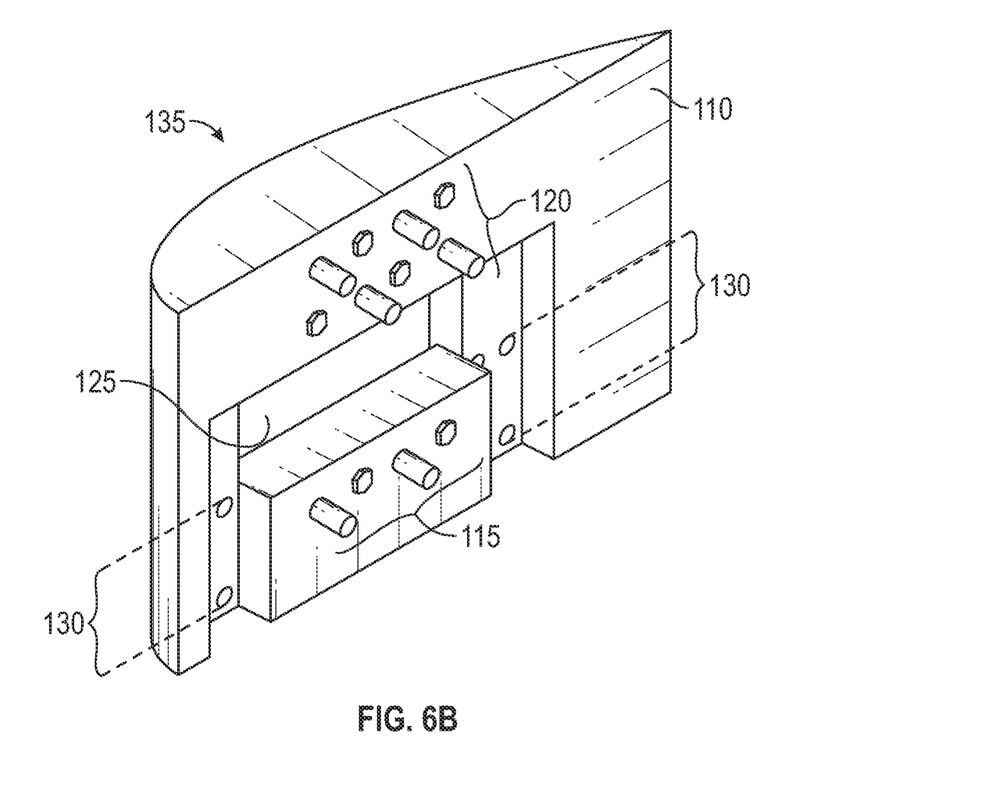
Figure 6C:
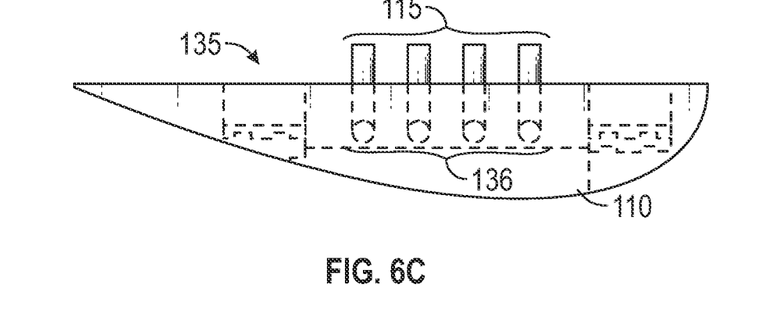
Figure 6D:
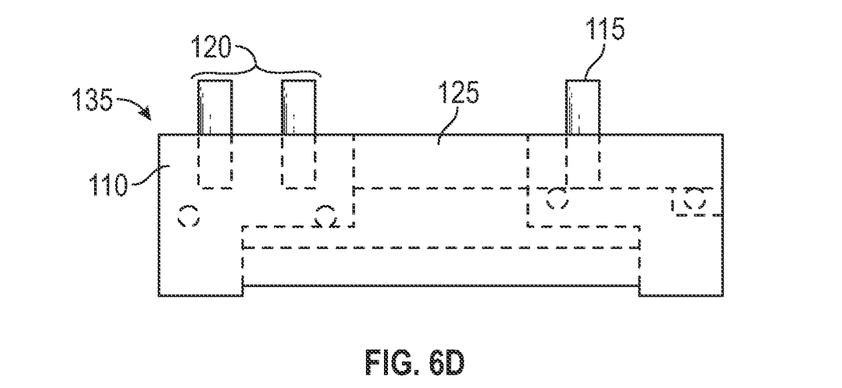
Figure 7A:
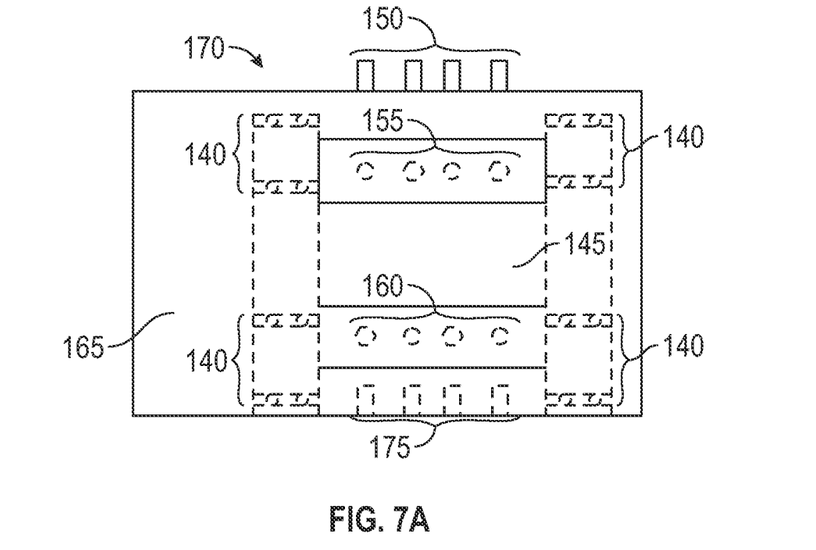
FIGS. 7A, 7B, 7C and 7D are drawings showing different views of a middle module half of a modular blade apparatus according to an embodiment of the present invention.
Figure 7B:
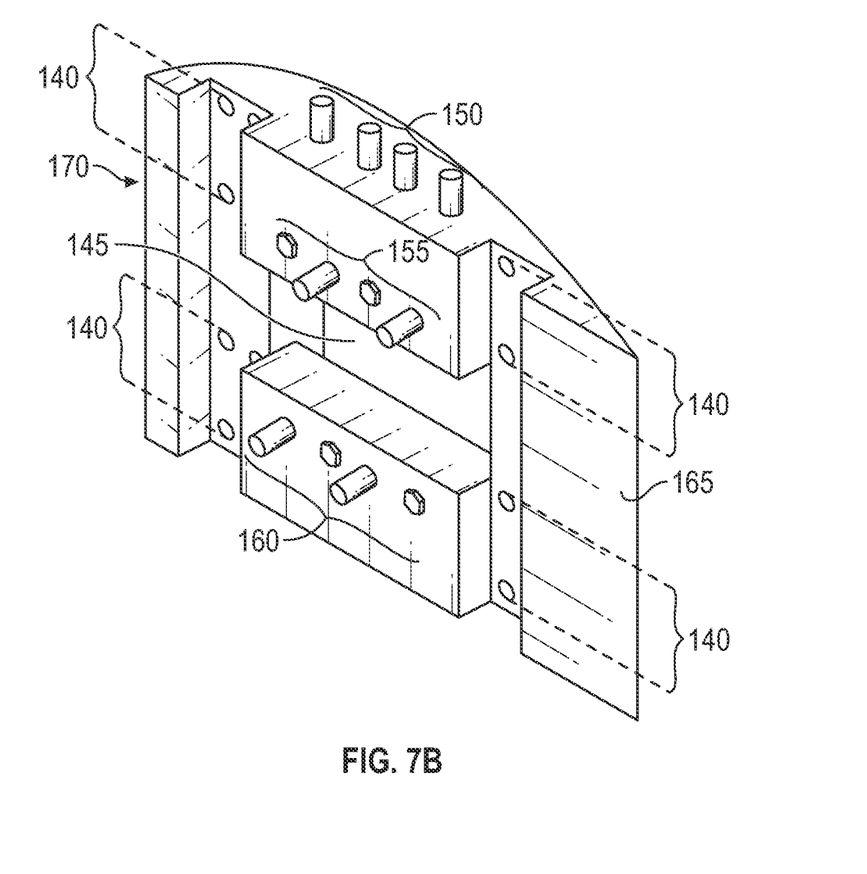
Figure 7C:
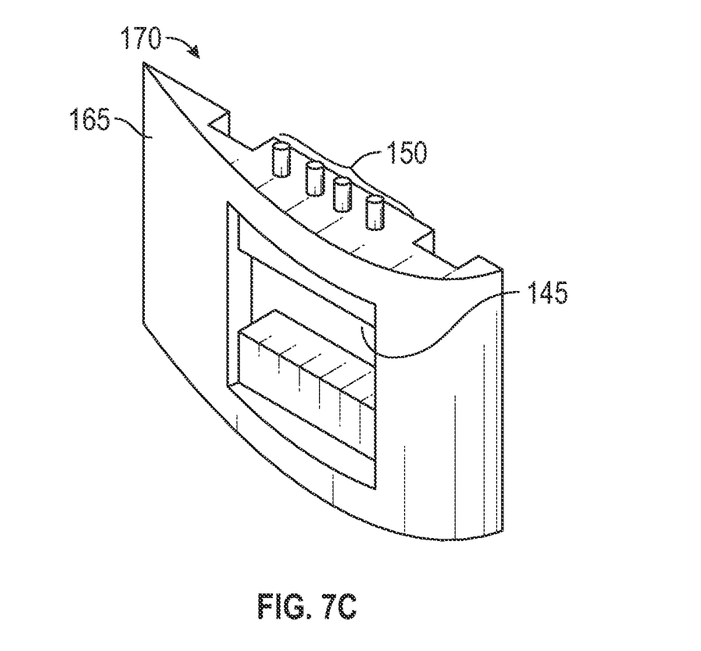
Figure 7D:
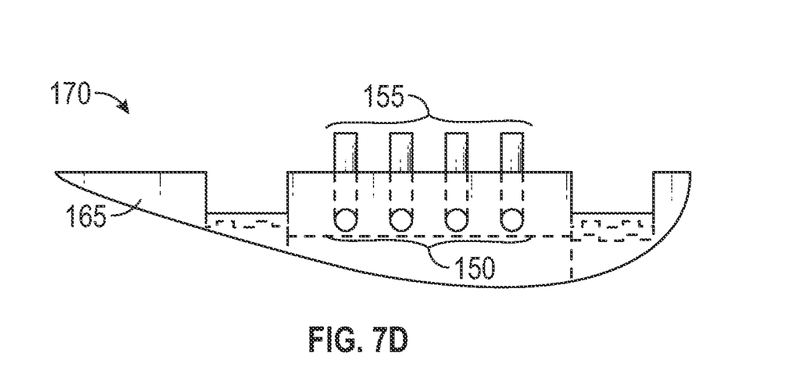
Figure 8A:
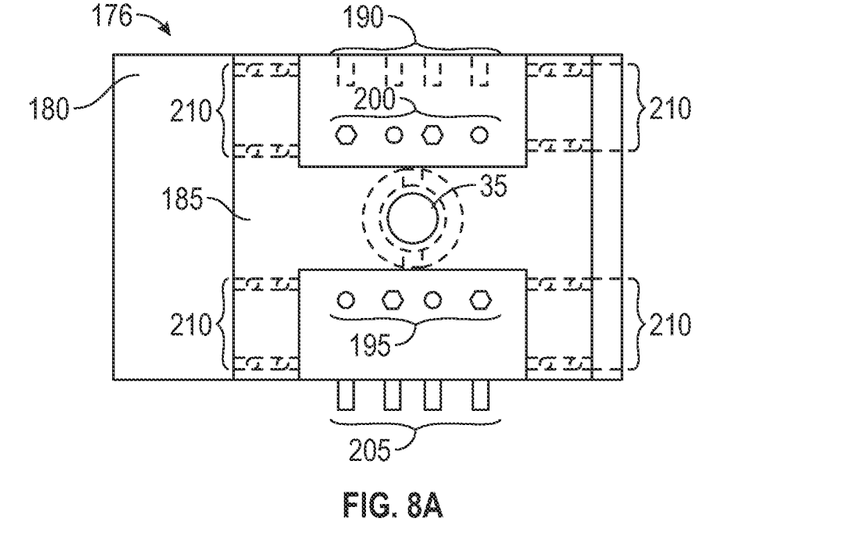
FIGS. 8A, 8B, 8C and 8D are drawings showing different views of a first half of a T-connector module half of a modular blade apparatus according to an embodiment of the present invention.
Figure 8B:
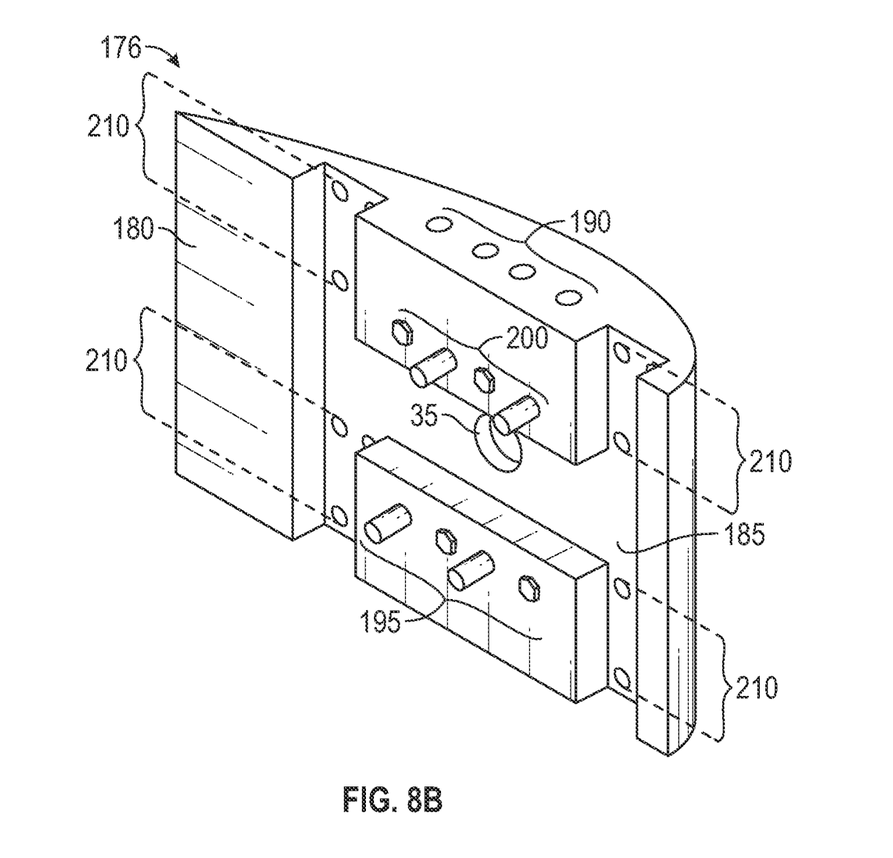
Figure 8C:
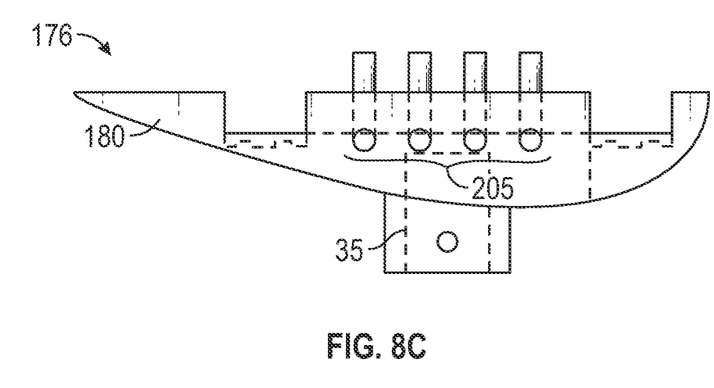
Figure 8D:
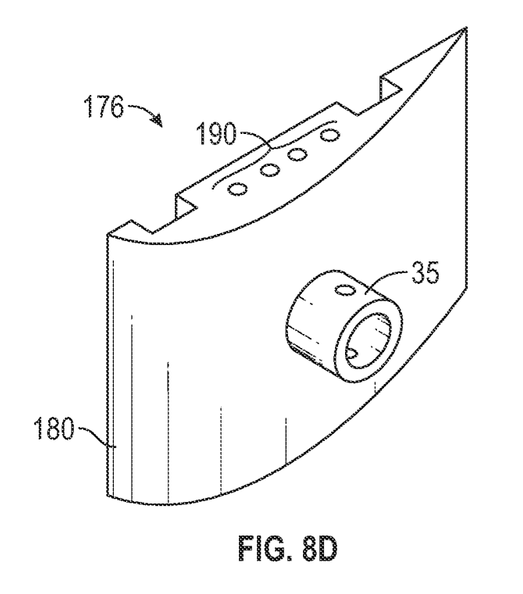

The apparatus shown in FIG. 4 is an interior view of a modular blade 5. Preferably, power conduits 60 connect to secondary power sources 30 to supplement power generated by modular blade apparatus 4. Connection point 35 allows modular blade 5 to connect to a spoke 10 or rotor 15. The connection point may be a fastener, aperture, prong, or any other means to connect T-connector module 45 to spoke 10 or rotor 15. Modular blade 5 preferably comprises a modular blade first half 20 and second half 25. Modular blade 5 also preferably comprises at least one set of middle interior prong arrays 75, at least one set of upper prong arrays 65, or at least one set of lower prong arrays 70 to secure the modular blade apparatus halves or modules.

The apparatus shown in FIGS. 5A-5D show different views of first end module half 76 of modular blade 5. First end module half 76 comprises body 80, central cavity 85, and fastener points 105. Fastener points 105 allow for first end module 76 to be securely connected to another modular component and/or secondary power source 30. Bottom prong array 95 and top prong array 90 are preferably affixed to or molded into body 80. Bottom prong array 95 and top prong array 90 allow for the first end module 76 to be securely connected to another modular component. An exterior prong array 100 is affixed to or molded into body 80. Exterior prong array 100 allows for first end module 76 to be securely connected to another modular component.

The apparatus shown in FIGS. 6A-6D show different views of second end module half 135 of modular blade 5. Second end module half 135 preferably comprises body 110, central cavity 125, and fastener points 130. Fastener points 130 allow for the second end module half 135 to be securely connected to another modular component and/or a secondary power source 30. Bottom prong array 115 and top prong array 120 are preferably affixed to or molded into body 110. Bottom prong array 115 and top prong array 120 allow for the second end module half 135 to be securely connected to another modular component. Exterior cavity array 136 is preferably affixed to or molded into the body 110. Exterior prong array 136 allows for second end module half 135 to be securely connected to another modular component.

The apparatus shown in FIGS. 7A-7D show different views of middle module half 170 of modular blade 5. Middle module half 170 preferably comprises body 165, central cavity 145, and fastener points 140. Fastener points 140 allow for middle module half 170 to be securely connected to another modular component and/or a secondary power source 30. Bottom prong array 160 and top prong array 155 are affixed to or molded into body 165. Bottom prong array 160 and top prong array 155 allow for middle module half 170 to be securely connected to another modular component. Exterior prong array 150 and exterior cavity array 175 are affixed to or molded into body 165. Exterior prong array 150 and exterior cavity array 175 allow for middle module half 170 to be securely connected to another modular component.

The apparatus shown in FIGS. 8A-8D show different views of T-connector module half 176 of modular blade 5. T-connector module half 176 preferably comprises body 180, central surface 185, and fastener points 210. Fastener points 210 allow for T-connector module half 176 to be securely connected to another modular component and/or secondary power source 30. Connection point 35 is preferably affixed to or molded into body 180. Connection point 35 allows for T-connector module half 176 to be securely connected to spoke 10 or rotor 15. Bottom prong array 195 and top prong array 200 are preferably affixed to or molded into body 180. Bottom prong array 195 and top prong array 200 allow for T-connector module half 176 to be securely connected to another modular component. Exterior prong array 205 and exterior cavity array 190 are preferably affixed to or molded into body 180. Exterior prong array 205 and exterior cavity array 190 allow for T-connector module half 176 to be securely connected to another modular component.

Figure 9:
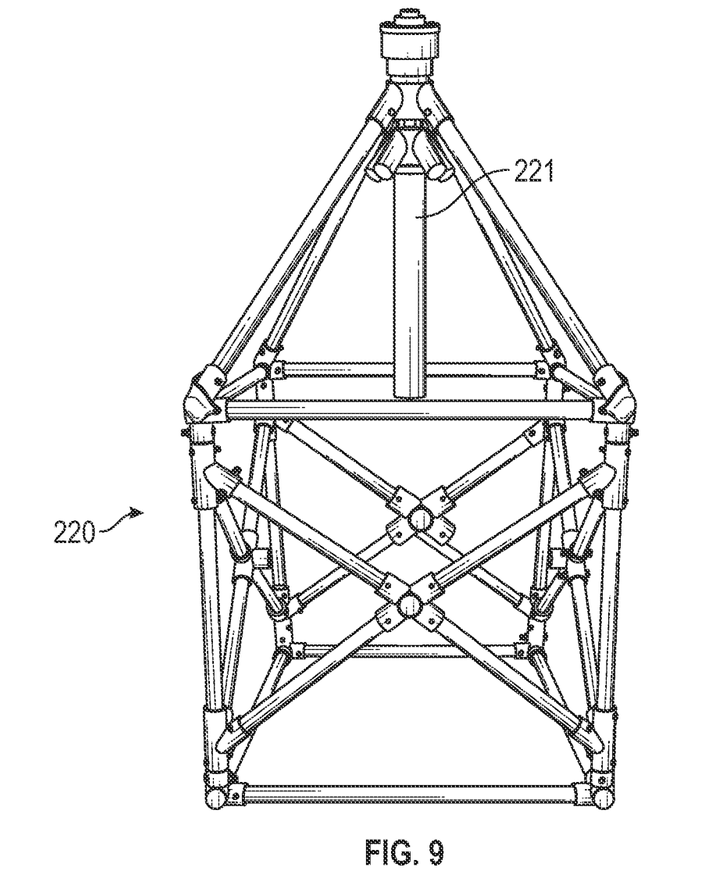
FIG. 9 is a drawing of the power generator system support base according to an embodiment of the present invention.

The apparatus shown in FIG. 9 is a support base 220 for a fully assembled power generator system 1. Preferably, support base 220 supports modular blade apparatus 4 such that modular blade apparatus 4 can rotate, thereby rotating rotor shaft 221 to transmit the rotational energy to slip gear assembly 225 preferably disposed within support base 220.

Figure 10:
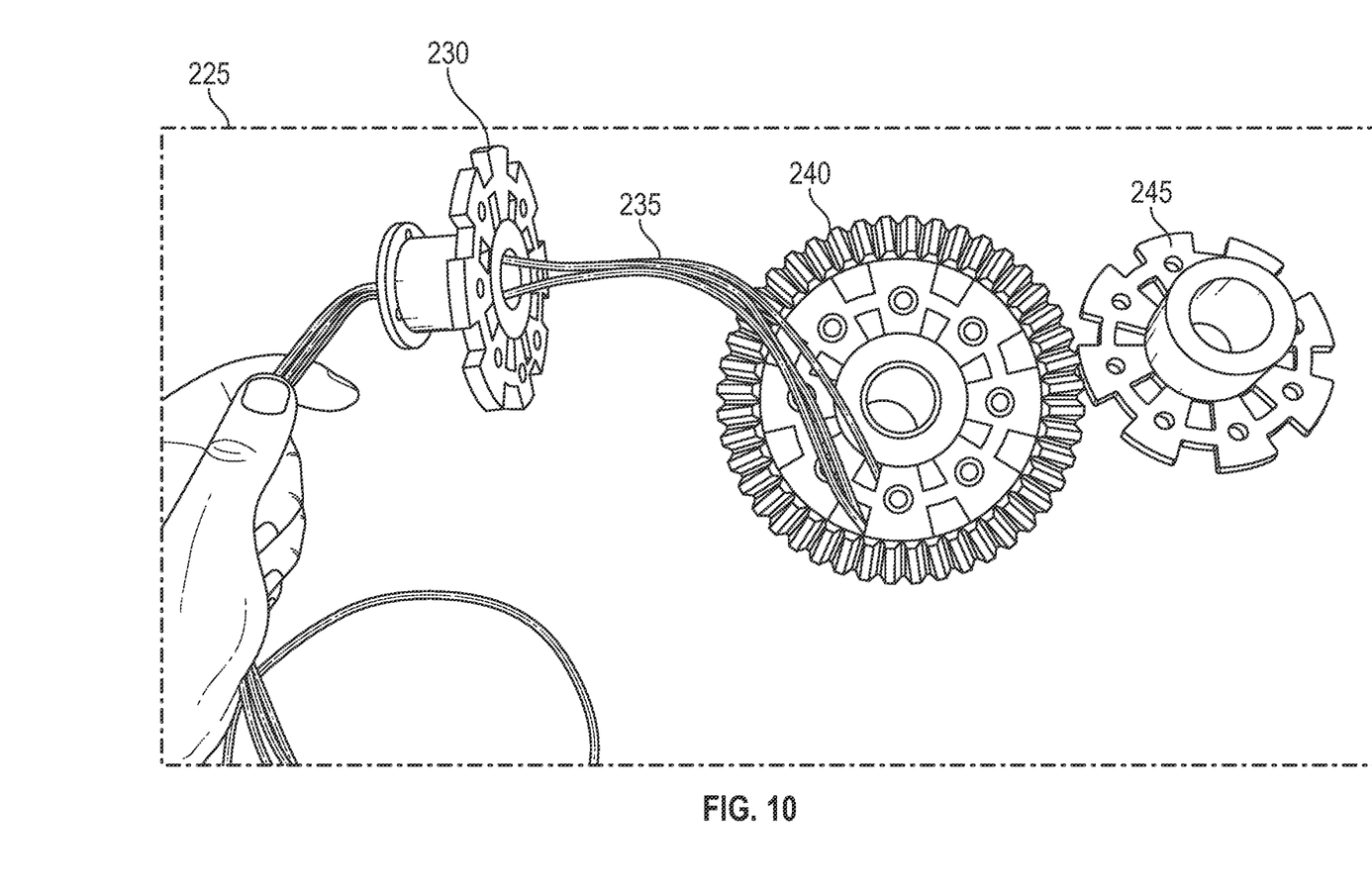
FIG. 10 is a drawing of a slip gear apparatus for a power generator system according to an embodiment of the present invention.

Embodiments of the present invention are directed to solving the problem of connecting wires from secondary power source panels 30 on rotating blades 5 to the power generation system. The apparatus shown in FIG. 10 is a slip gear assembly 225 for power generator system 1. Bevel gear 240 is preferably at least partially disposed between slip ring 230 and slip ring 245 to allow bevel gear 240 to rotate independently of slip rings 230 and 245. Power conduit 235, originating from secondary power source panels 30 through rotating rotor shaft 221, is preferably threaded through slip gear assembly 225 to allow bevel gear 240 to rotate without displacing power conduit 235.

The dimensions of power generation system 1 vary depending on the scale of the particular application. Preferably, power generation system 1 is between about six inches and a thousand feet in height, more preferably between about ten feet and five hundred feet in height, and most preferably between about two hundred and four hundred feet in height.

Due to its modular design, power generation system 1 can be manufactured such that its individual components are of a size that is much smaller than the size of typical wind turbines available today, making transportation much more efficient without needing specialized vehicles or services that are typically required of transporting massively long wind turbines. Power generation system 1 can be made available as a "kit" of instructions for additive manufacturing so that it can be constructed to the desired dimensions of a particular site or circumstances without having to customize the entire system itself. For example, the height of modular blade 5 can be constructed not from having to customize the entire design of the system, but from simply stacking more middle modules 50 on each other to increase the height of modular blade 5, which can be done on-site without requesting a re-design of the whole system. In this way, the process of manufacturing and installing power generation system 1 involves only a single design of the components captured in the initial "kit" of instructions for additive manufacturing, and the actual dimensions of the power generation system 1 can be determined and constructed as desired at the ultimate site of installation.

Embodiments of the present invention are also directed to methods of manufacturing and installing power generation system 1. Preferably, the components of power generation system 1 described herein are manufactured by additive manufacturing based on instructions for the same. Since power generation system 1 can be scaled to any dimensions that the materials and manufacturing facility would physically permit, the additive manufacturing instructions would not need modification for any particular application other than to specify certain dimensions. This creates the potential for mass production of standard components that can then be easily commercialized for numerous different applications, whether it be a power generation system 1 for installation on the roof of a residence, or a large power generation system 1 atop a hill or off shore generating megawatts of power.

The various components of power generation system 1 described herein can also be made available as a pre-manufactured "kit" in which the installer requests such a system of certain dimensions and the manufacturer provides the number of components that would accomplish the installer's specifications.

Embodiments of the present invention provide a technology-based solution that overcomes existing problems with the current state of the art in a technical way to satisfy an existing problem for people and companies that need to cheaply and quickly construct a power turbine. Embodiments of the present invention achieve important benefits over the current state of the art. Some of the unconventional steps of embodiments of the present invention include cheaper and faster turbine construction due modular blade components.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

EXAMPLES

The invention is further illustrated by the following non-limiting example which illustrates one possible scenario of how a fully assembled power generator system with modular blades 1 could be used and made.

A wind turbine was created in multiple modular sections. These included the turbine blades, segments, shaped segments, gearbox, and frame. The turbine blades were made of multiple 3D printed segments and shaped segments that were connected to create a solid frame, skeletal system, or support structure to facilitate airfoil-shaped turbine blades. The segments and the resulting support structure were shaped to provide housing for the solar cells. Once the segments and shaped segments were 3D printed, they were assembled using various methods of attachment including but not limited to fasteners, adhesives, friction, or any assembly method that bonds the pieces sufficiently to withstand wind conditions. The segments were designed to snap together. The solar cells were mounted to the frame, skeletal system, or support structure using various methods of attachment including but not limited to fasteners, adhesives, friction, or any assembly method that bonds the pieces sufficiently to withstand wind conditions. The solar cells were wired together within each of the blade frames, skeletal systems, or support structures. The turbine blades were connected to the axle, which houses more wiring and more custom 3D printed parts. The turbine blades were connected to axle by a separate structure suitable for withstanding wind conditions, in this case a base of PVC pipes. A structure was constructed to support the wind turbine and provide a foundation for the bevel and gearbox. The gearbox was made, at least partially, using 3D printed parts to contain the bevel and spur gears. In this way, from the bevel gears, the rotational energy was transferred to a chain which then rotated the generator axle to create electricity. A slip ring was constructed inside the larger bevel gear and connected to the solar cell wiring path via the slip ring. In this way, the wires were prevented from kinking and twisting by the slip ring. By locating the slip ring inside the bevel gear, the wiring could be concealed and allowed for a more streamlined wind turbine.

What is claimed is:

1. A power generation system comprising:
   a modular blade comprising at least one middle module, wherein said middle module further comprises a middle module first half on a first side and a middle module second half on a second side, each of said middle module first half and middle module second half comprising a first end and a second end, the modular blade capable of rotating to provide rotational kinetic energy;
   a rotor connectable to said modular blade;
   at least one spoke connectable to said rotor and said modular blade;
   a support base;
   wherein said modular blade comprises an end module comprising an end module first half on a first side and an end module second half on a second side, each of said end module first half and end module second half comprising a first end and a second end;

wherein said modular blade comprises a T-connector module comprising a T-connector module first half on a first side and a T-connector module second half on a second side, each of said T-connector module first half and T-connector module second half comprising a first end and a second end, and wherein said first side comprises a connection point;

photovoltaic cells disposed on or within said modular blade;

wherein said rotor comprises an outer area and an inner area, wherein said outer area rotates independently of said inner area, and wherein wiring for said photovoltaic cells is disposed within said inner area between said photovoltaic cells and a gear assembly comprising at least one slip ring, said gear assembly disposed within said support base.

2. The system of claim 1, wherein said modular blade is 3-D printed.

3. The system of claim 1 further comprising a bevel gear disposed between a first slip ring of said at least one slip ring and a second slip ring of said at least one slip ring, and said wiring is disposed through said bevel gear.

4. A power generation apparatus comprising:
a modular blade comprising:
an end module first half on a first side and an end module second half on a second side, each of said end module first half and end module second half comprising a first end and a second end; and
a T-connector module comprising a T-connector module first half on a first side and a T-connector module second half on a second side, each of said T-connector module first half and T-connector module second half comprising a first end and a second end, and wherein said first side has a connection point;

one middle module comprising a middle module first half on a first side and a middle module second half on a second side, each of said middle module first half and middle module second half comprising a first end and a second end.

5. The apparatus of claim 4, wherein said first end of said end module comprises a plurality of connectors.

6. The apparatus of claim 4, wherein said first end of said end module comprises a plurality of cavities.

7. The apparatus of claim 4, wherein said first end of said middle module comprises a plurality of connectors and wherein said second end of said middle module comprises a plurality of cavities.

8. The apparatus of claim 4, wherein said first end of said middle module comprises a plurality of cavities and wherein said second end of said middle module comprises a plurality of connectors.

9. The apparatus of claim 4, wherein said apparatus is 3D-printed.

10. The apparatus of claim 4, further comprising a secondary power source.

11. The apparatus of claim 4, wherein said first end of said T-connector module comprises a plurality of connectors and wherein said second end of said T-connector module comprises a plurality of cavities.

12. The apparatus of claim 4, wherein said first end of said T-connector module comprises a plurality of cavities and wherein said second end of said T-connector module comprises a plurality of connectors.

* * * * *